(12) United States Patent
Liu et al.

(10) Patent No.: US 11,368,470 B2
(45) Date of Patent: Jun. 21, 2022

(54) REAL-TIME ALERT REASONING AND PRIORITY-BASED CAMPAIGN DISCOVERY

(71) Applicant: International Business Machines Corporation, Armonk, NY (US)

(72) Inventors: Yushan Liu, Princeton, NJ (US); Xiaokui Shu, Ossining, NY (US); Douglas Lee Schales, Ardsley, NY (US); Marc Philippe Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 16/439,916

(22) Filed: Jun. 13, 2019

(65) Prior Publication Data

US 2020/0396230 A1 Dec. 17, 2020

(51) Int. Cl.
*H04L 29/06* (2006.01)

(52) U.S. Cl.
CPC ...... *H04L 63/1416* (2013.01); *H04L 63/1441* (2013.01)

(58) Field of Classification Search
CPC ............. H04L 63/1416; H04L 63/1441; H04L 63/1483; H04L 67/322
USPC .......................................................... 726/23
See application file for complete search history.

(56) References Cited

U.S. PATENT DOCUMENTS

| | | | |
|---|---|---|---|
| 8,132,260 B1 * | 3/2012 | Mayer | H04L 67/125 726/25 |
| 8,495,747 B1 * | 7/2013 | Nakawatase | G06F 21/577 726/25 |
| 8,984,643 B1 * | 3/2015 | Krisher | H04L 63/1433 726/25 |
| 9,270,695 B2 * | 2/2016 | Roytman | H04L 63/1433 |
| 10,015,186 B1 * | 7/2018 | Tamir | H04L 63/1433 |
| 10,666,494 B2 * | 5/2020 | Zafer | H04L 41/069 |
| 10,673,880 B1 * | 6/2020 | Pratt | H04L 63/1425 |

(Continued)

OTHER PUBLICATIONS

Liu et al, "Towards a Timely Causality Analysis for Enterprise Security," Network and Distributed Systems Security (NDSS) Symposium 2018, Feb. 2018.

(Continued)

*Primary Examiner* — Badri Narayanan Champakesan
(74) *Attorney, Agent, or Firm* — Jeffrey S. La Baw; David H. Judson

(57) ABSTRACT

Advanced Persistent Threat (APT) defense leverages priority-based tracking around alerts, together with priority-based alert reasoning task scheduling. In one embodiment, individual alert reasoning tasks are managed by an alert scheduler, which effectively allocates available computation resources to prioritize the alert reasoning tasks, which each execute within processing workers that are controlled by the alert scheduler. An alert reasoning task typically is prioritized (relative to other such tasks) according to one or more factors, such as severity levels, elapsed time, and other tracking results. By implementing priority-based task scheduling, the task scheduler provides for alert reasoning tasks that are interruptible. In this approach, and once an alert is assigned to a task and the task assigned a worker, priority-based connectivity tracker around each alert is carried out to provide further computational efficiency.

25 Claims, 9 Drawing Sheets

(56) References Cited

U.S. PATENT DOCUMENTS

| | | | |
|---|---|---|---|
| 10,749,890 B1* | 8/2020 | Aloisio | G06N 5/003 |
| 10,979,446 B1* | 4/2021 | Stevens | H04L 63/1441 |
| 2002/0010855 A1* | 1/2002 | Reshef | G06F 21/554 |
| | | | 713/164 |
| 2003/0093514 A1* | 5/2003 | Valdes | H04L 41/16 |
| | | | 709/224 |
| 2005/0209866 A1* | 9/2005 | Veeningen | G06Q 10/0635 |
| | | | 705/7.28 |
| 2007/0226803 A1* | 9/2007 | Kim | H04L 63/145 |
| | | | 726/24 |
| 2008/0244747 A1* | 10/2008 | Gleichauf | H04L 67/306 |
| | | | 726/25 |
| 2012/0159462 A1* | 6/2012 | Leibman | G06F 11/1438 |
| | | | 717/140 |
| 2014/0090068 A1* | 3/2014 | Guarnieri | G06F 21/577 |
| | | | 726/25 |
| 2014/0215481 A1* | 7/2014 | Piet | G06F 11/008 |
| | | | 718/104 |
| 2014/0237545 A1* | 8/2014 | Mylavarapu | H04L 63/1433 |
| | | | 726/3 |
| 2015/0163242 A1* | 6/2015 | Laidlaw | H04L 63/1433 |
| | | | 726/22 |
| 2015/0172311 A1* | 6/2015 | Freedman | H04L 63/1441 |
| | | | 726/1 |
| 2017/0019419 A1* | 1/2017 | Kholidy | G06F 21/00 |
| 2017/0098087 A1* | 4/2017 | Li | H04L 63/1433 |
| 2017/0324758 A1* | 11/2017 | Hart | H04L 63/1416 |
| 2017/0346842 A1* | 11/2017 | Giral | H04L 63/1433 |
| 2018/0032736 A1* | 2/2018 | Inagaki | G06Q 10/0635 |
| 2018/0034836 A1* | 2/2018 | Chen | H04L 63/1425 |
| 2018/0343279 A1* | 11/2018 | Stute | H04L 63/1433 |
| 2019/0116136 A1* | 4/2019 | Baudart | G06F 40/30 |
| 2020/0014713 A1* | 1/2020 | Paul | H04L 63/20 |
| 2020/0097325 A1* | 3/2020 | Vadapandeshwara | |
| | | | G06F 3/0683 |
| 2020/0162497 A1* | 5/2020 | Iyer | H04L 63/1433 |

OTHER PUBLICATIONS

Ma et al, "ProTracer: Towards practical provenance tracing by alternating between logging and tainting," NDSS '16, Feb. 21, 2016.

Chow et al, "Understanding data lifetime via whole system simulation," USENIX Security Symposium, 2004, pp. 321-336.

Milajerdi, et al, "HOLMES: Real-time APT detection through correlation of suspicious information flows," Proceedings of the 40th IEEE Symposium on Security and Privacy (S&P), May 2019.

Hossain, et al, "SLEUTH: Real-time attack scenario reconstruction from COTS audit data," Proceedings of the 26th USENIX Security Symposium, Aug. 2017.

Hassan, et al, "NODOZE: Combatting threat alert fatigue with automated provenance triage," Network and Distributed Systems Security Symposium, Feb. 2019.

King et al, "Backtracking intrusions," SOSP '03, Oct. 19-22, 2003.

King et al, "Enriching intrusion alerts through multi-host causality," NDSS, 2005.

Godefroid, et al, "Automated whitebox fuzz testing," NDSS, 2008.

Goel, et al, "The taser intrusion recovery system," SOSP '05, Oct. 23-26, 2005.

Jiang, et al, "Provenance-aware tracing of worm break-in and contamination: a process coloring approach," Distributed Computing Systems, 2006, ICDCS 2006: 26th IEEE International Conference.

Ma et al, "Accurate, low cost and instrumentation-free security audit logging for Windows," Proceedings of the 31st Annual Computer Security Applications Conference, ACSAC '15, Dec. 7-11, 2015.

Gao et al, "SAQL: A stream-based query system for real-time abnormal system behavior detection," USENIX Security, 2018.

Gao et al, "AIQL: Enabling efficient attack investigation from system monitoring data," USENIX ATC, 2018.

Gu et al, "Principled reasoning and practical applications of alert fusion in intrusion detection systems," Proceedings of the 2008 ACM Symposium on Information, Computer and Communications Security, ASIACCS '08, 2008.

Ning, et al, "Constructing attack scenarios through correlation of intrusion alerts," Proceedings of the 9th ACM Conference on Computer and Communications Security, ACM 2002.

Ning, et al, "Hypothesizing and reasoning about attacks missed by intrusion detection systems," ACM Transactions on Information and System Security (TISSEC), 2004.

Ning, et al, "Building attack scenarios through integration of complementary alert correlation methods," NDSS, 2004.

Qin et al, "Statistical causality analysis of infosec alert data," International Workshop on Recent Advances in Intrusion Detection, Springer 2003.

Revathi, et al., "Network intrusion detection system using reduced dimensionality," Indian Journal of Computer Science and Engineering (IJCSE), vol. 2, No. 1, 2011.

Zhang et al, "Inferring users' online activities through traffic analysis," Proceedings of the 4th ACM Conference on Wireless Network Security, ACM 2011.

* cited by examiner

REAL-TIME ALERT REASONING AND PRIORITY-BASED CAMPAIGN DISCOVERY

STATEMENT REGARDING SPONSORED RESEARCH

This invention was made with government support under Contract FA8650-15-C-7561 awarded by the Defense Advanced Research Projects Agency (DARPA). The government has certain rights in the invention.

BACKGROUND

Technical Field

This disclosure relates generally to cybersecurity.

Background of the Related Art

Advanced persistent threats (APT) have become a serious challenge to enterprise security. An APT is a cyber attack where intruders maintain a sustained secretive presence inside an enterprise network with a malicious ultimate goal, such as intellectual property theft, sensitive information acquisition or infrastructure sabotage. APTs have plagued many high value enterprise businesses and have resulted in costly damage. In 2017, a devastating data breach at Equifax exposed the sensitive personal information of 143 million US customers. Unlike conventional attacks, APT attacks are stealthy and consist of multiple stages such that attackers can go unnoticed even for years. Adversaries often act slowly and gradually expand their presence in an enterprise network over prolonged periods of time and eventually accomplish their mission goals. As a result, a majority of their individual steps can be seemingly innocent and are not suspicious enough to raise alerts from intrusion detection systems (IDS). Because IDS alerts only capture a small portion of attack steps which are often not directly connected from each other, it is hard to identify the full attack sequence without further investigation of these unconnected alerts.

To protect enterprises from APTs, human analysts need to continuously examine the alerts reported by IDSes, connect the missing dots between alerts and uncover the root cause and influences of potential attacks. Recent work has leveraged alert causality tracking, which tracks the causal dependencies between files, processes and sockets collected by monitoring systems on enterprise hosts, to enrich the context information about alerts. Specifically, security experts perform multi-hop backward/forward tracking to retrieve causalities that lead to or caused by alerts and identify evidence of malicious activities. This serves as the first step towards achieving a thorough understanding of potential attacks and taking appropriate responses. However, due to the massive daily audit logs produced at enterprise scale (in the order of gigabytes), performing causality tracking for an alert often leads to a extremely huge and noisy causal graph, which can be a heavy computational burden and very time consuming to generate and investigate. Aside from that, IDSes are prone to alert flooding, i.e., a substantial amount of alerts are generated and false alerts are commonplace. Even with alert aggregation and correlation techniques, the sheer number of the eventually generated alerts is still staggering and barely manageable considering the complexity of alert causality tracking. As a result, automated procedures and human analysts are overwhelmed with a stream of alert tracking tasks, and could fail to respond to the critical alerts promptly.

To address this problem, extensive efforts have been made towards efficient alert investigation. One approach (called ProTracer) proposed using taint analysis and tagging to facilitate the causality tracking, but this type of tracking simply traverses all the entities, delaying the reactions to critical alerts. Another approach (called PrioTracker) introduced priority-based tracking to the causality analysis domain, but this solution used a fixed priority score without reflecting the context, thereby resulting in inaccurate priority assessment. Other solutions attempt to improve accuracy of alerts by the correlation of suspicious information flows, or by using a network diffusion algorithm to compute the suspicious score of an event from neighboring events. While these techniques may provide some advantages, this prior work focuses on causality tracking from a single alert, and it does not address the processing of a large amount of alerts. Presently, the scheduling of alert tracking tasks to maximize the utilization of limited processing power has not been explored or addressed.

Thus, there remains a need to provide for a context-adaptive real-time alert investigation system that is able to keep up with real-time alert generation with timely responses to critical alerts.

BRIEF SUMMARY

According to this disclosure, the severity of an alert is persistently re-assessed based on newly-learned context (including the alert's neighboring events, and causal connections with other alerts) to provide for context-adaptive prioritization, and available processing resources are intelligently allocated among alerts dynamically according to the adjusted severity. To this end, this disclosure provides a real-time alert investigation computing system that continuously handles a large stream of alerts, preferably with such context-adaptive prioritization among these alerts for efficient campaign discovery. In one embodiment, the system manages a group of concurrent alert tracking procedures that are interruptible and resumable, preferably continuously re-computes the severity of alerts based on the enriched context information, and accordingly allocates the computational resources (which may be limited) among different alerts. By implementing a task queue and scheduling the tasks according to the dynamically derived priorities, the system adapts to the newly-learned context.

According to this approach, threat defense leverages priority-based tracking around alerts, together with priority-based alert reasoning task scheduling. In one embodiment, individual alert reasoning tasks are managed by an alert scheduler, which effectively allocates the available computation resources to prioritize the alert reasoning tasks, which each execute within processing instances or threads (each a "worker") that are controlled by the alert scheduler. Typically, there is an alert reasoning task associated with an alert dequeued from an alert queue. An alert reasoning task typically is prioritized (relative to other such tasks) according to one or more factors, such as severity levels, elapsed time, and other tracking results. By implementing priority-based task scheduling, the task scheduler provides for alert reasoning tasks that are interruptible. Thus, and in lieu of killing a running task and then simply reassigning it to process a new alert, the task scheduler can pause a running old task to switch it to a new (and perhaps critical) alert, save any state of the task being paused, and selectively resume the task later, e.g., when the worker becomes idle. In this approach, and once an alert is assigned to a task (and that task is assigned a worker), priority-based tracking (connectivity) around the alert is carried out.

In particular, entities/events are associated with a priority score (e.g., based on attack knowledge, information flow, prior learning, etc.), and important tracked entities/events are then saved as "waypoints." The task then attempts to explore these interesting/informative parts first, tracking causalities backwards, identifying overlapping waypoints, and storing intermediate processing results (namely, waypoints with timestamps, and shortest paths from waypoints to alerts). This approach, which implements a partial connectivity computation, provides less repetition during computation, and better concurrency of the results. Partial tracking results generated by the alert reasoning task also can be used for analytics, or maintained as a state that can be later processed further. As the priority-based trackers execute, the resulting information is then used by the task scheduler to reassess the task priority (alert severity) and then adjust the scheduling priorities and alert-to-worker assignments accordingly. The scheduler iterates, thereby ensuring that highest priority alerts are processed preferentially, irrespective of any constraints on the available computing resources.

The foregoing has outlined some of the more pertinent features of the disclosed subject matter. These features should be construed to be merely illustrative.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
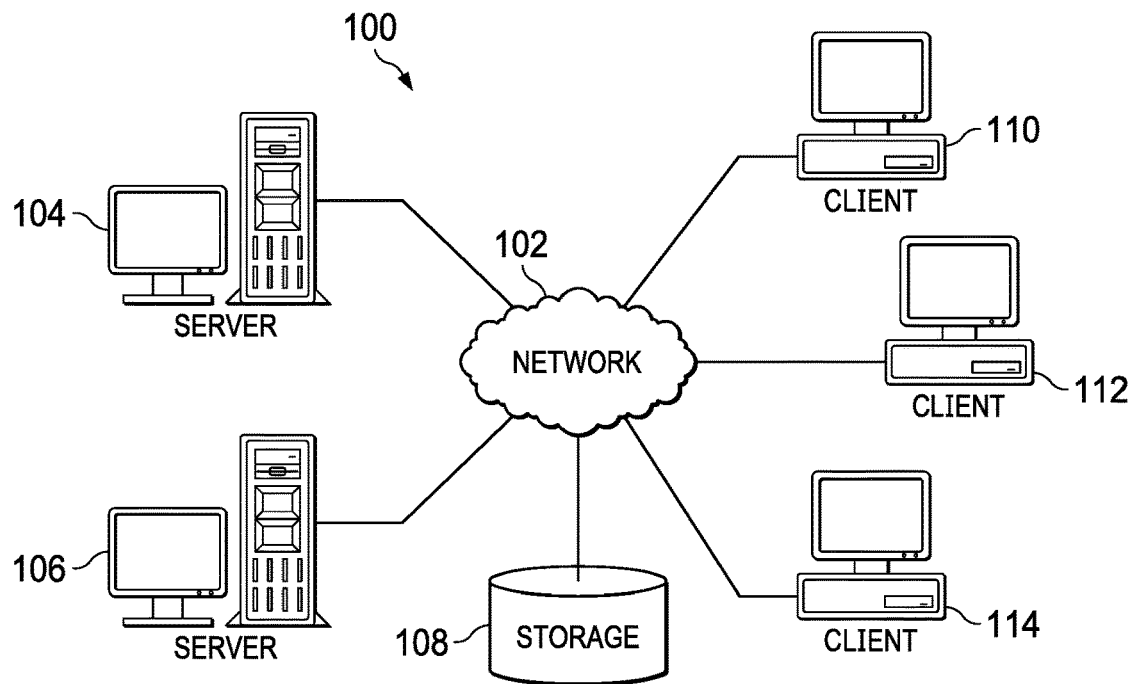
FIG. 1 depicts an exemplary block diagram of a distributed data processing environment in which exemplary aspects of the illustrative embodiments may be implemented.
Figure 2:
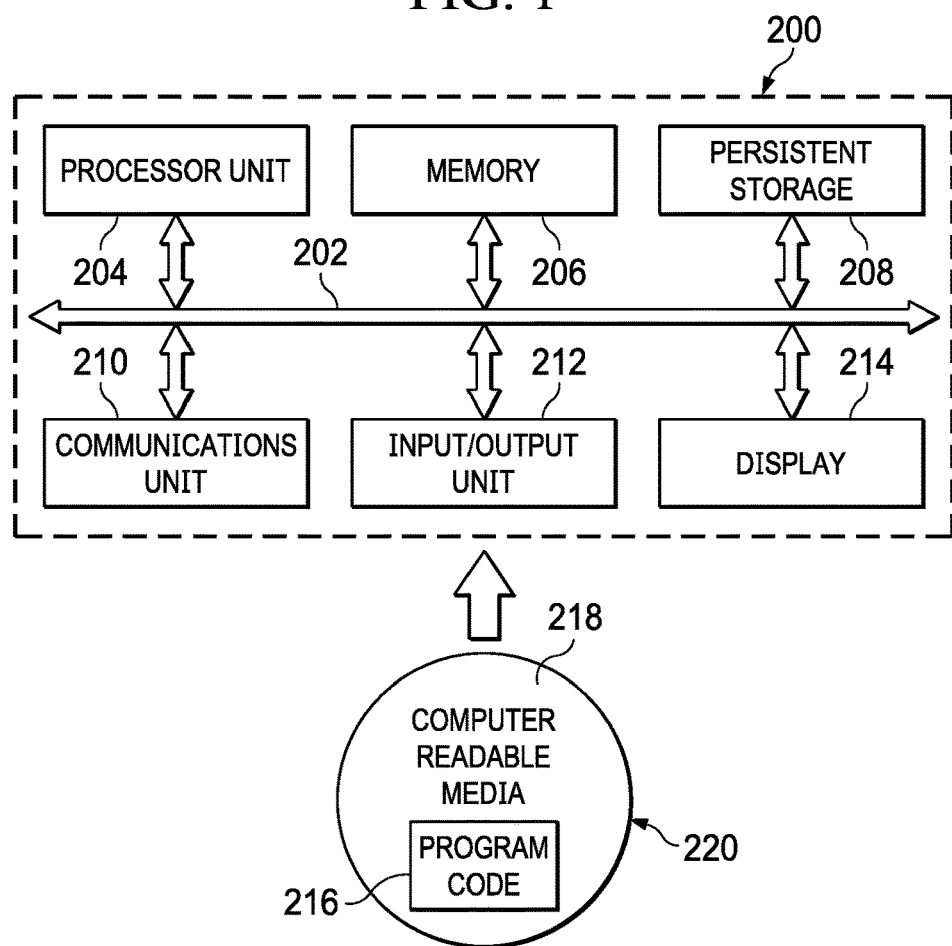
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary, and they are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts an exemplary distributed data processing system. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
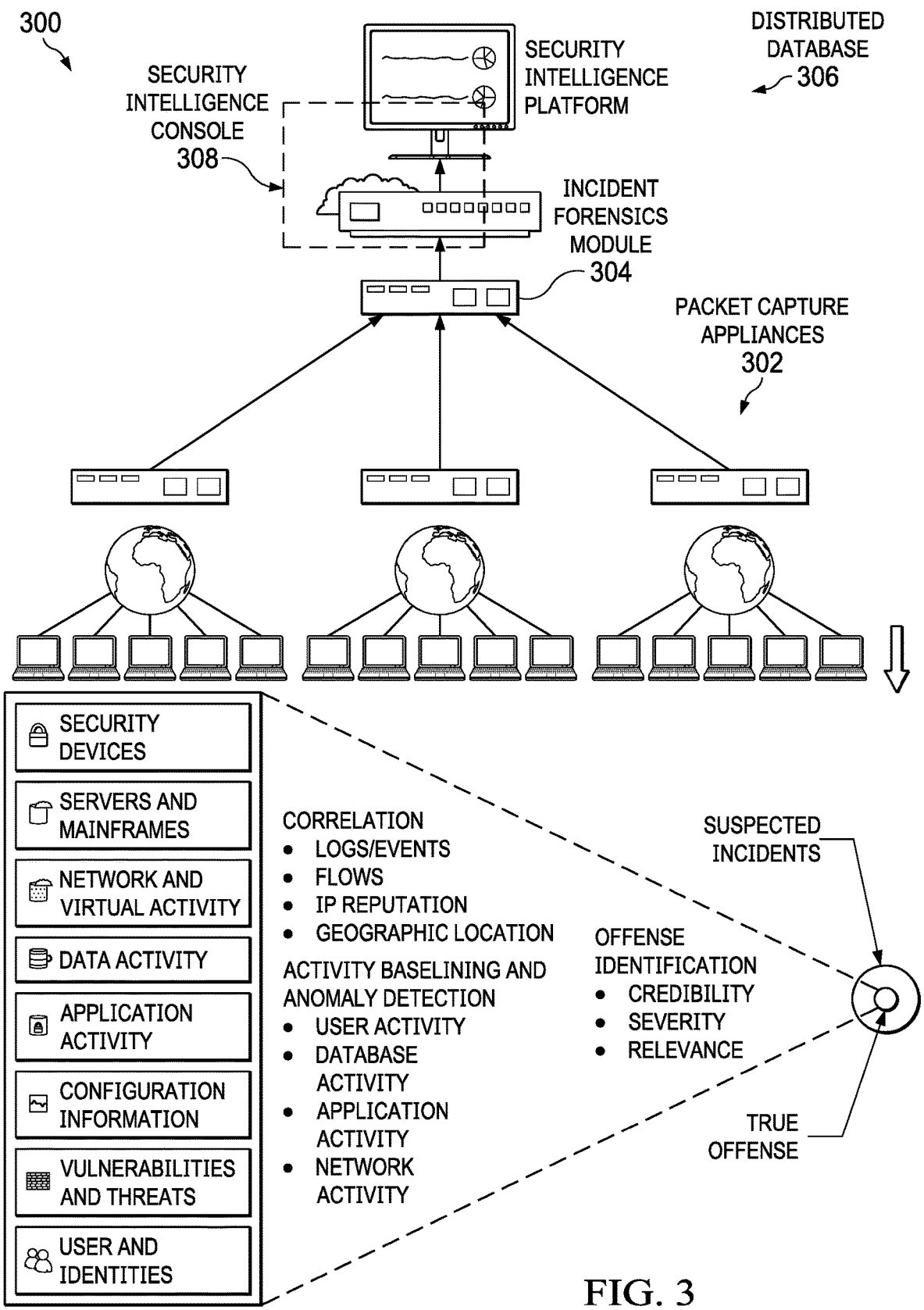
FIG. 3 illustrates a security intelligence platform in which the techniques of this disclosure may be practiced.

A representative security intelligence platform in which the techniques of this disclosure may be practiced is illustrated in FIG. 3.

Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis. A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk.

Figure 4:
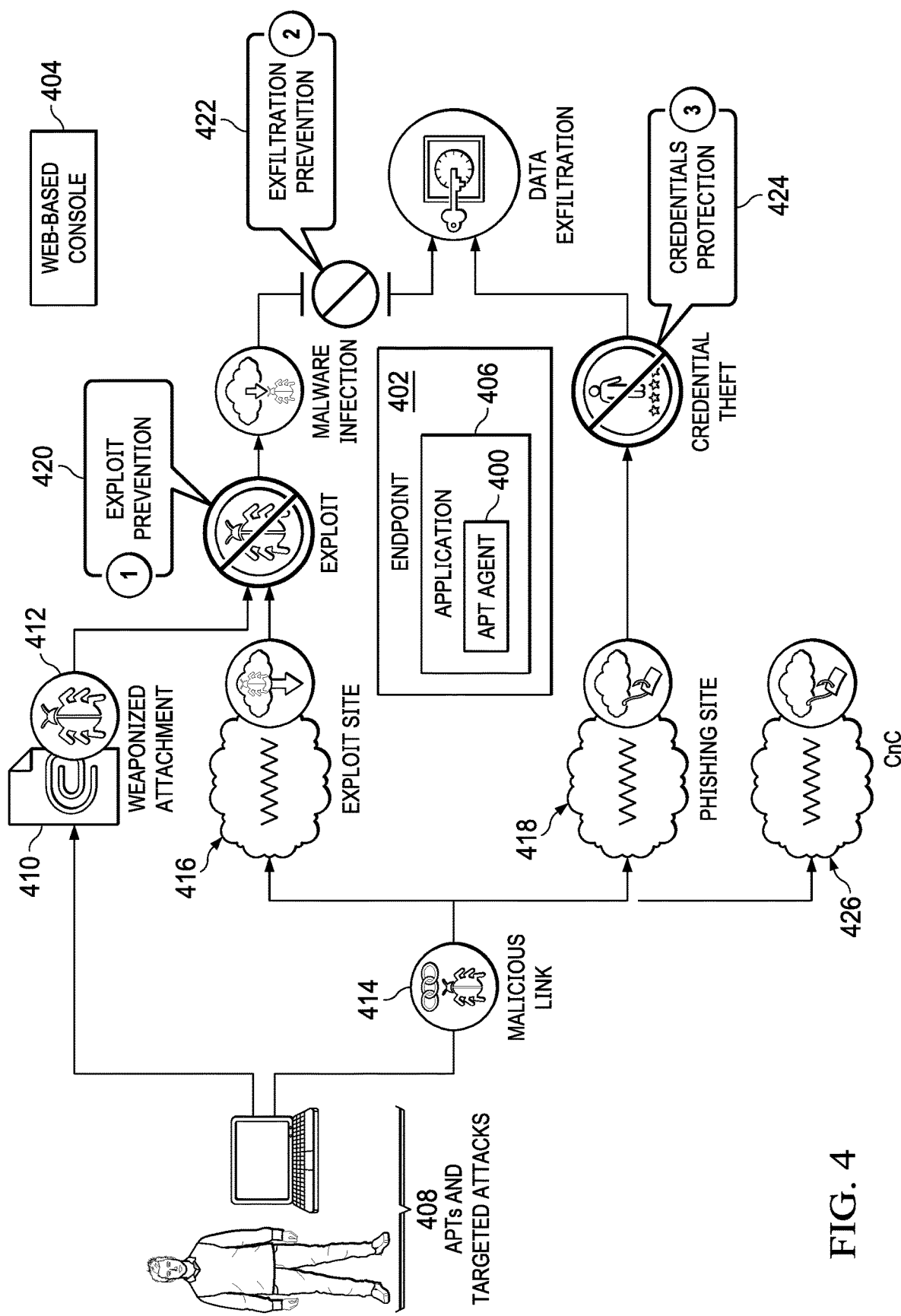
FIG. 4 depicts an Advanced Persistent Threat (APT) platform in which the techniques of this disclosure may be practiced.

An appliance of this type can facilitate Security Information Event Management (SIEM). For example, and as noted above, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar SIEM installation, the system such as shown in FIG. 4 is configured to collect event and flow data, and generate reports. A user (e.g., an SOC analyst) can then investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Advanced Persistent Threat (APT) Prevention

APT mitigation and prevention technologies are well-known. For example, IBM® Trusteer Apex® is an automated solution that prevents exploits and malware from compromising enterprise endpoints and extracting information. A solution of this type typically provides several layers of security, namely, exploit prevention, data exfiltration prevention, and credentials protection.

FIG. 4 depicts a typical embodiment, wherein the APT solution is architected generally as agent code 400 executing in enterprise endpoint 402, together with a web-based console 404 that enables IT security to manage the deployment (of both managed and unmanaged endpoints) from a central control position. The agent code 400 operates by monitoring an application state at the time the application 406 executes sensitive operations, e.g., writing a file to the file system. Generally, the agent 400 uses a whitelist of legitimate application states to verify that the sensitive operation is executed (or not) under a known, legitimate state. An exploit will attempt to execute sensitive operations under an unknown (not whitelisted) state, thus it will be stopped. The approach enables the APT agent to accurately detect and block both known and zero-day exploits, without knowing anything about the threat or the exploited vulnerability. The "agent" may be any code-based module, program, process, component, thread or the like.

FIG. 4 depicts how APT attacks typically unfold and the points at which the APT solution is operative to stop the intrusion. For example, here the attacker 408 uses a spear-phishing email 410 to send an employee a weaponized document, one that contains hidden exploit code 412. When the user opens the document with a viewer, such as Adobe Acrobat or Word, the exploit code runs and attaches to an application vulnerability to silently download malware on the employee computer 402. The employee is never aware of this download. Another option is to send a user a link 414 to a malicious site. It can be a malicious website 416 that contains an exploit code or a legitimate website that was compromised (e.g., through a watering hole attack). When the employee clicks the link and the browser renders the HTML content, the exploit code runs and latches onto a browser (or browser plug-in) vulnerability to silently download malware on the employee computer. The link can also direct the user to a phishing site (like a fake web app login page) 418 to convince the user to submit corporate credentials. After infecting the computer 402 with advanced malware or compromising corporate credentials, attacker 408 has established a foothold within the corporate network and then can advance the attack.

As depicted, the agent 400 protects the enterprise against such threats at several junctions: (1) exploit prevention 420 that prevents exploiting attempts from compromising user computers; (2) exfiltration prevention 422 that prevents malware from communicating with the attacker and sending out information if the machine is already infected with malware; and (3) credentials protection 424 that prevent users from using corporate credentials on non-approved corporate sites (including phishing or and public sites like social networks or e-commerce, for example). In one known approach, the agent performs these and related operations by monitoring the application and its operations using a whitelist of legitimate application states.

By way of additional background, information-stealing malware can be directly installed on endpoints by the user without requiring an exploit. To exfiltrate data, typically the malware must communicate with the Internet directly or through a compromised application process. Advanced malware uses a few evasion techniques to bypass detection. For example, it compromises another legitimate application process and might communicate with the attacker over legitimate websites (like Forums and Google Docs). The agent 400 is also operative to stop the execution of untrusted code that exhibits data exfiltration states. To this end, preferably it validates that only trusted programs are allowed to use data exfiltration techniques to communicate with external networks. The agent preferably uses several techniques to identify unauthorized exfiltration states and malicious communication channels, and blocks them. Because it monitors the activity on the host itself, it has good visibility and can accurately detect and block these exfiltration states.

The reference herein to the identified commercial product is not intended to be limiting, as the approach herein may be implemented with any APT solution or functionality (even if embedded in other systems).

Figure 5:
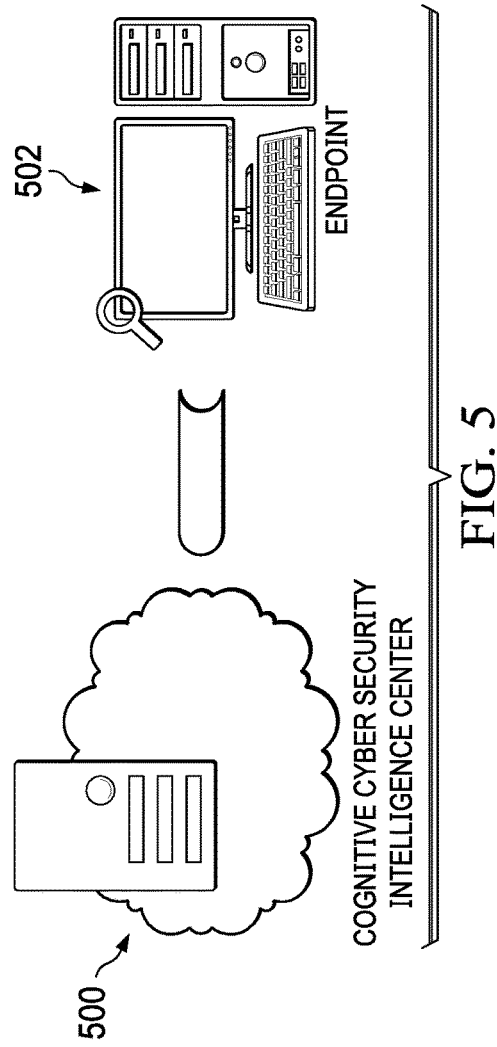
FIG. 5 illustrates an operating environment in which a cognitive cybersecurity intelligence center is used to manage an endpoint machine and in which the techniques of this disclosure may be implemented.

As further background, FIG. 5 depicts a basic operating environment that includes a cognitive cybersecurity intelligence center 500, and an endpoint 502. An endpoint 502 is a networked device that runs systems management code (software) that enables management and monitoring of the endpoint by the intelligence center 500.

The endpoint typically is a data processing system, such as described above in FIG. 2. The intelligence center 500 may be implemented as a security management platform such as depicted in FIG. 3, in association with an APT solution such as depicted in FIG. 4, or in other management solutions. Thus, for example, known commercial products and systems that provide endpoint management include IBM® BigFix®, which provides system administrators with remote control, patch management, software distribution, operating system deployment, network access protection and hardware and software inventory functionality. A commercial system of this type may be augmented to include the endpoint inter-process activity extraction and pattern matching techniques of this disclosure, or such techniques may be implemented in a product or system dedicated for this purpose.

In a typical implementation, an endpoint is a physical or virtual machine or device running an operating system such as Windows, Mac OSX, Vmware ESX, Linux, Unix, as various mobile operating systems such as Windows Phone, Symbian, iOS and Android. The cybersecurity intelligence center typically operates as a network-accessible security management platform comprising a plurality of machines and application software. Typically, the intelligence center supports cybersecurity analytics, e.g., using machine learning and the like. The intelligence center may operate in a dedicated manner to support a plurality of endpoints, or "as-a-service" on behalf of multiple enterprises each having their own endpoints. Typically, endpoint machines communicate with the intelligence center in a client-server paradigm, such as depicted in FIG. 1 and described above. The intelligence center may be located and accessed in a cloud-based operating environment.

In a typical use case, inter-process events are sent from endpoints, such as endpoint 502, to a detection server executing in the intelligence center 500, where such events are analyzed. Preferably, attack detection occurs in the detection server. This approach provides for an efficient, systematic (as opposed to merely ad hoc) mechanism to record endpoint activities via inter-process events, to describe a malicious or suspicious behavior of interest with abstractions (network graphs), and to match concrete activities (as represented in the recorded events) with abstract patterns. This matching enables the system to act upon malicious/suspicious behaviors (e.g., by halting involved processes, alerting, dropping on-going network sessions, halting on-going disk operations, and the like), as well as to assist security analysts to locate interesting activities (e.g., threat hunting) or to determine a next step that may be implemented in a workflow to address the suspect or malicious activity.

Typically, both direct and indirect inter-process activities are extracted at endpoints and compared with pre-defined malicious behavior patterns for detection. Direct and indirect inter-process activities typically include control flow, such as process spawn, and information exchange via channels, such as files, sockets, messages, shared memory and the like. Inter-process activities reveal goals of processes and their particular execution paths. In the approach herein, they are matched against malicious inter-process behaviors for detecting attack instances. Preferably, the malicious behavior patterns are pre-defined with abstraction to characterize key steps in cyberattacks. These malicious behavior patterns typically are stored in an endpoint, and they can be updated as necessary.

Figure 6:
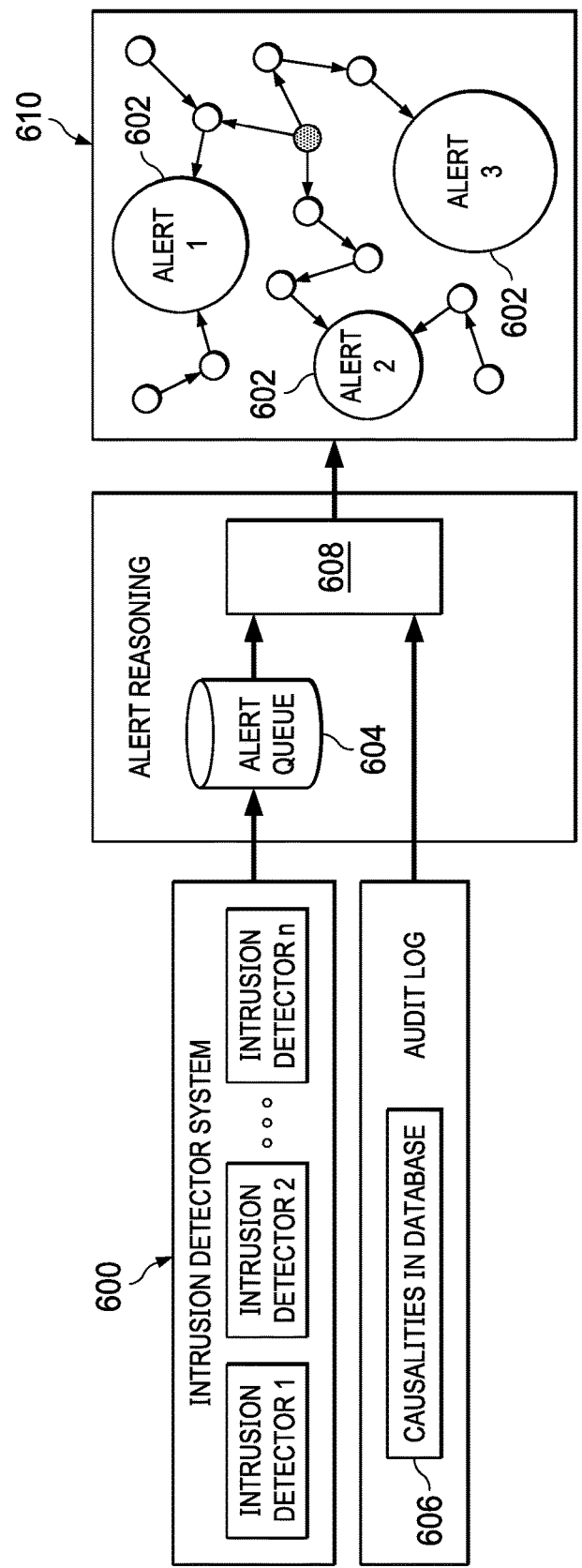
FIG. 6 depicts an alert reasoning system that is augmented to include the real-time alert and priority-based campaign discovery mechanism of this disclosure.

FIG. 6 depicts how causality tracking can be used to detect, understand and recover from APTs. In this example, one or more intrusion detectors 600 (or, more generally, any data source(s) of point analytics) provide individual (isolated) alerts 602 to an alert queue 604. Alert queue 604 thus provides for a shared alert (i.e., message) queue in the sense that alerts may be receiving from distinct alerting sources. An audit system comprises a database 606 that provides an audit log of causal dependencies, e.g., among operating system (OS)-level components. As described above, typically the log provides log data associating entities (e.g., processes, files, sockets, etc.) and events (e.g., execute, fork, file read/write, socket read/write, etc.). An alert reasoning component/functionality 608 reads the alerts from the alert queue 604 and processes the isolated alerts into a causal graph 610. The alert reasoning component 608 also provides for context enrichment and provenance tracking.

Figure 7:
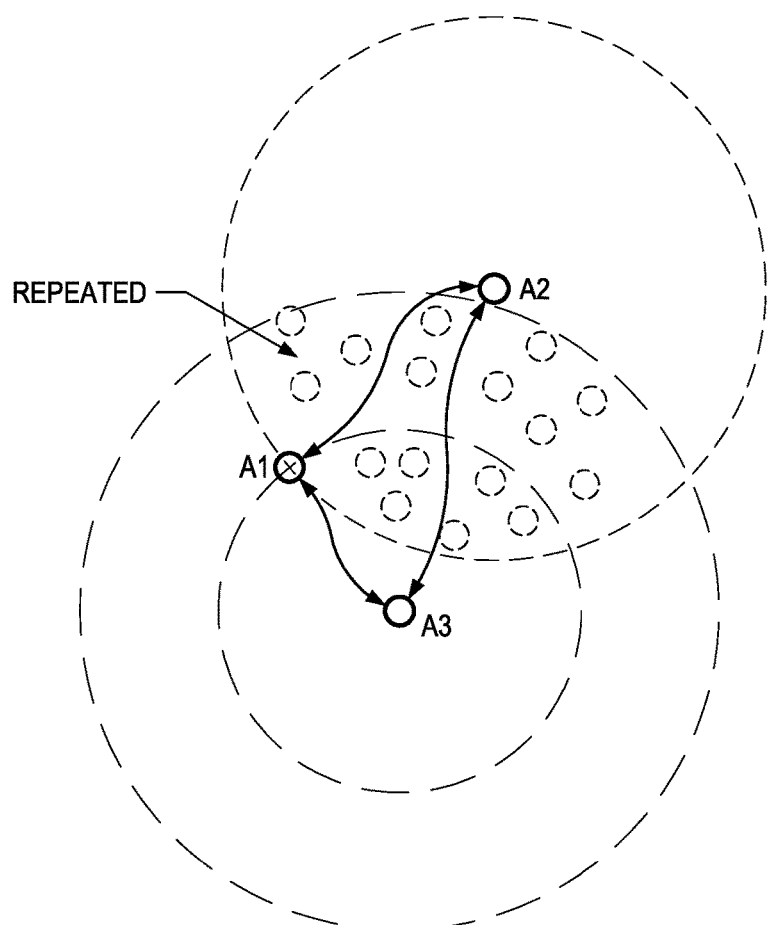
FIG. 7 depicts how an alert reasoning task in the system of FIG. 6 tracks causal connections with other alerts without the technique of this disclosure.

Causality tracking/reasoning using a system such as depicted in FIG. 6 presents significant processing challenges, primarily due to the large number of alerts being received by the system as compared to the ones that relate to actual attack traces, as well as the complexity of the alert reasoning tasks that must then be spawned to analyze the individual alerts. Typically, alert reasoning is carried out by a computing system executing an alert reasoning task. As used herein, and depending on implementation, a "task" may be implemented in general as a set of computer program instructions comprising a process, a program, an execution thread, a program code instance, etc., although typically the task executes in association with an operating system (OS) kernel. Because many alerts (typically at different severity levels) may be arriving at the alert queue in a burst, there is a requirement to spawn many alert reasoning tasks, and this can become computationally- and storage-inefficient, especially if there are only limited (or restricted) processing and storage resources available. Moreover, the tracking of an alert by the alert reasoning task itself is often computationally-inefficient. This is because the task typically operates by dequeueing an alert from the queue, and then testing causal connectivity of that alert to previous alerts, with the testing process being then repeated for one or more previous alerts. As the task tracks causality in this iterative manner, the paths to many alerts often overlap upon one another, and thereby many alerts get traced repeatedly, which slows down the processing. FIG. 7 depicts an example.

In FIG. 7, it is assumed that alert A1 is a new alert that is dequeued from the shared alert queue. To test connectivity to previous alerts, the alert reasoning task identifies that A1 is related to earlier alert A2, which in turn is related to another alert A3 also having connectivity to alert A1. The circular regions represent causality regions that are being evaluated. As shown in FIG. 7, and with respect to a given session, complete computation to find a path between each pair of alerts requires that the alert reasoning task process many intermediate points (the alerts shown in dotted lines) multiple times (e.g., connectivity (A2, A1) and connectivity A3, A2)). This type of repeated testing of alert points is often computionally-inefficient.

A naïve design approach to address these type of problems is simply to kill an old tracking task (working on some prior alert) to switch that task to process a new alert. That approach, however, is unsatisfactory because partial results are not returned from the killed task, thereby resulting in loss of potentially-useful causality data loss. As a corollary, when many alerts arrive (e.g., in a burst), human analysts are over-stresssed and may often fail to analyze critical alerts promptly.

Other computational inefficiencies arise when there are few or no alerts over some time period; in such case, computation resources are thereby idled and wasted.

Real-Time Alert Reasoning and Priority-Based Campaign Discovery (RAPID)

With the above as background, the techniques of this disclosure are now described.

According to this approach, enhanced alert reasoning in a cybersecurity analytics system is provided by priority-based tracking around alerts, together with priority-based alert reasoning task scheduling. In this approach, individual alert reasoning tasks are managed by an alert scheduler, which effectively allocates the available computation resources to prioritize the alert reasoning tasks; these tasks execute within processing instances or threads (each a "worker") that are controlled by the alert scheduler. Causality reasoning herein using an alert reasoning task may involve dividing the task into smaller tasks (sub-tasks) of the same type, and processing the sub-tasks. Typically, there is an alert reasoning task associated with an alert dequeued from an alert queue. An alert reasoning task typically is prioritized (relative to other such tasks) by the scheduler according to one or more factors, such as severity levels, elapsed time, and other tracking results. By implementing priority-based task scheduling, the task scheduler provides for alert reasoning tasks that are interruptible. Thus, and in lieu of killing a running task and then simply reassigning it to process a new alert, the task scheduler can pause a running old task to switch it to a new (and perhaps critical) alert, save any state of the task being paused, and selectively resume the task later, e.g., when the worker becomes idle. In this approach, priority-based tracking preferably involves performing fewer computations for the alert connectivity testing than prior techniques (such as described above with respect to FIG. 7). In particular, and in accordance with another aspect, entities/events are associated with a priority score (e.g., based on attack knowledge, information flow, prior learning, etc.), and important tracked entities/events are then saved as "waypoints." As it is executing (continuously), the task then attempts to explore these interesting/informative parts first, tracking causalities backwards, identifying overlapping waypoints, and (and the while) storing intermediate processing results (namely, waypoints with timestamps, and shortest paths from waypoints to alerts). This approach, which is sometimes referred to herein as a partial connectivity computation, provides less repetitive processing (over alerts) during computation, and better concurrency of the results. Further, and according to another aspect, the partial tracking results generated by the alert reasoning task also can be used for analytics, or maintained as a state that can be later processed further.

Generalizing, the technique herein provides a mechanism for so-called Real-time Alert reasoning and Priority-based campaign Discovery, and thus the approach (and the system) is sometimes referred to by the acronym RAPID. This nomenclature is not intended to be limiting. Typically, the RAPID mechanism is built upon (or otherwise associated with) an audit log system (such as depicted in FIG. 6) that collects OS-level activities, i.e., causal dependencies/events between entities, such as files, processes and sockets. On top of the audit log, and as also depicted in FIG. 6, the mechanism consumes alerts raised by IDSes (or other data sources) and conducts provenance tracking from alerts on the causal graph. According to this disclosure, and as will be seen, RAPID also performs alert reasoning in a timely manner. In general, this is achieved by evaluating the severity of alerts dynamically, e.g., based upon gathered context information, and then scheduling the alert reasoning tasks accordingly, thereby maximizing the utilization of available processing resources.

To that end, and as will be seen, in this approach alert reasoning tasks are interruptible, and the RAPID system (and, in particular, the task scheduler) agilely switches focus between and among the tasks, to thereby respond to the most critical alerts. Preferably, each task is configured to track multi-hop causal dependencies backwards from an alert. An individual tasks is interruptible, meaning that is can be selectively paused, saved and resumed later to continue tracking. Also, and as noted above, preferably results of a task are harvested continuously such that partial results are stored and become available for analytics even if the tracking is on-going or being paused.

Figure 8:
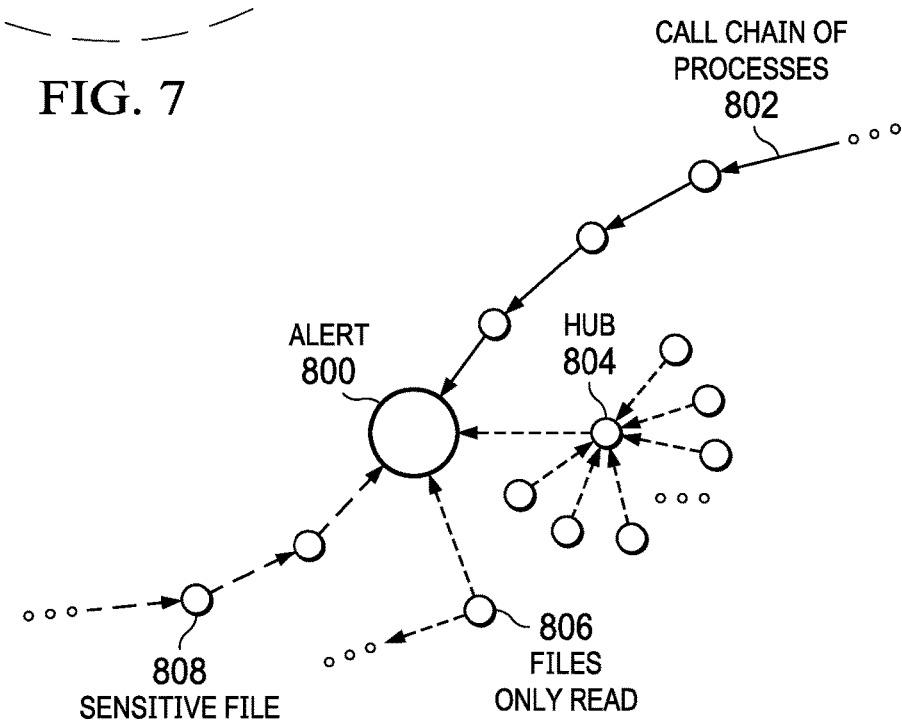
FIG. 8 depicts priority-based tracking around an alert to generate a sub-graph of waypoints associated to the alert according to an aspect of this disclosure.

FIG. 8 depicts the basic technique of priority-based tracking around an alert according to an aspect of this disclosure. (This operation is carried out after the task scheduler has assigned an alert reasoning task to process the alert). In this approach, and as noted above, an alert reasoning task has been assigned (spawned) as a result of the alert 800 having been dequeued from the alert queue. As depicted, when the task expands around the alert, preferably it explores the interesting/informative parts first. In this example causal graph portion, which is merely representative, the alert 800 has occurred after a call chain of processes 802, and with respect to a hub 804 (to which various hosts are coupled), one or more 806 that are read-only, and a sensitive data file 808. The priority-based tracking associates entities/events with a priority score, e.g., a score that is based on one or more of the followings: attack knowledge, information flow, and other available learning. In this example, the attack knowledge may be provided by the call chain 802, and the information flow may evaluate (correlate) entities such as the hub and the read-only files. The learning may be of different types, e.g., topological anomaly scores. The tracked entities/events that are identified by the priority-based tracking are then stored as "waypoints." A particular waypoint is assigned a timestamp. Stated another way, the technique depicted in FIG. 8 preferably involves a task performing a partial connectivity computation around the alert to track causalities backwards, with those causalities (or at least given ones) then marked as alert A's waypoints. As noted, a waypoint is associated with a timestamp, and a sub-graph that includes the waypoint typically depicts the shortest paths from the waypoint to the alert. This waypoint-based graph enables efficient exploration of the more interesting/informative parts of the graph in a manner that is now described.

In this manner, and as FIG. 8 depicts, the alert reasoning task (once assigned by the scheduler) performs an entity priority-based investigation around a given alert. In particular, and for each entity, the alert reasoning task considers one or more causal paths that are found from alerts to the entity and derives thir priority. In doing so, the system preferably incorporates attack knowledge, information gain and learning-based anomaly detection algorithms into the priority computation. At each step of tracking, an entity bearing a highest priority preferably is selected to track one-hop (or "n" hops) backwards.

Figure 9:
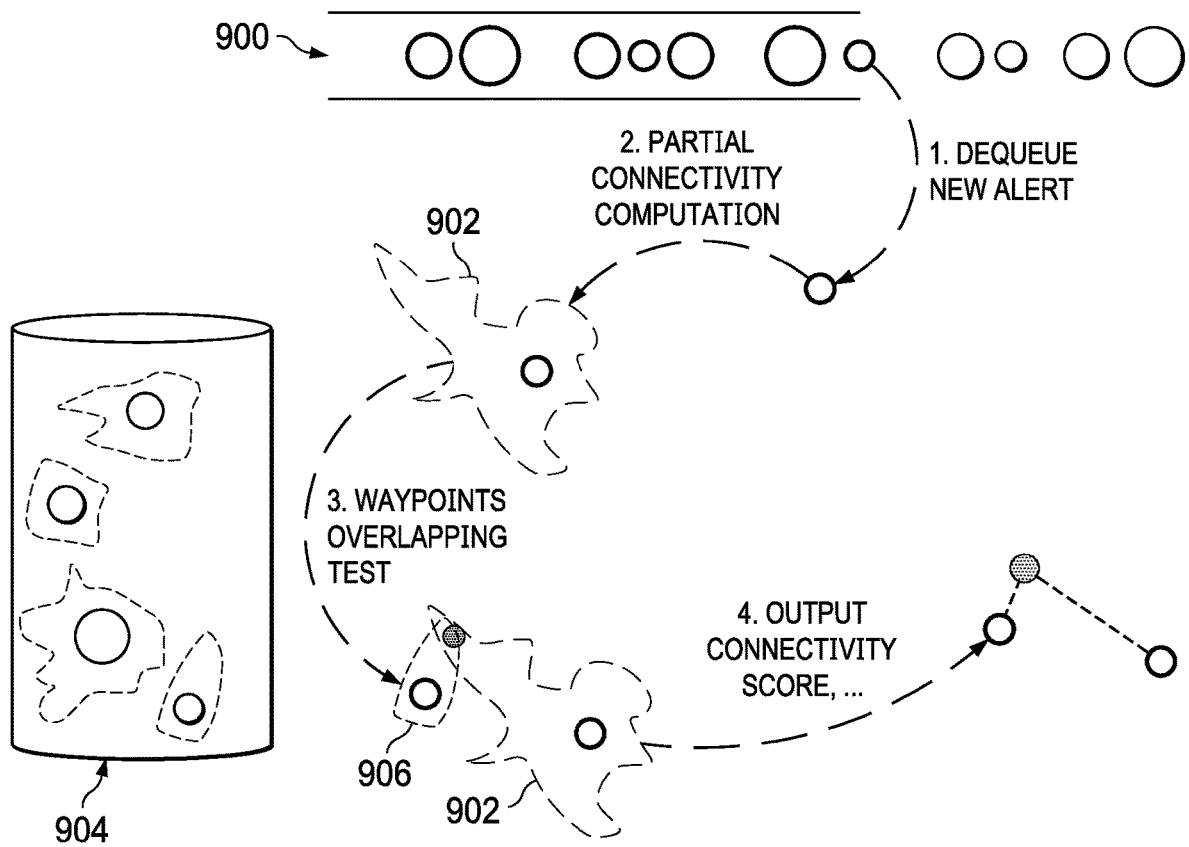
FIG. 9 depicts an operation of an alert reasoning algorithm used by the real-time alert reasoning system of this disclosure.
Figure 10:
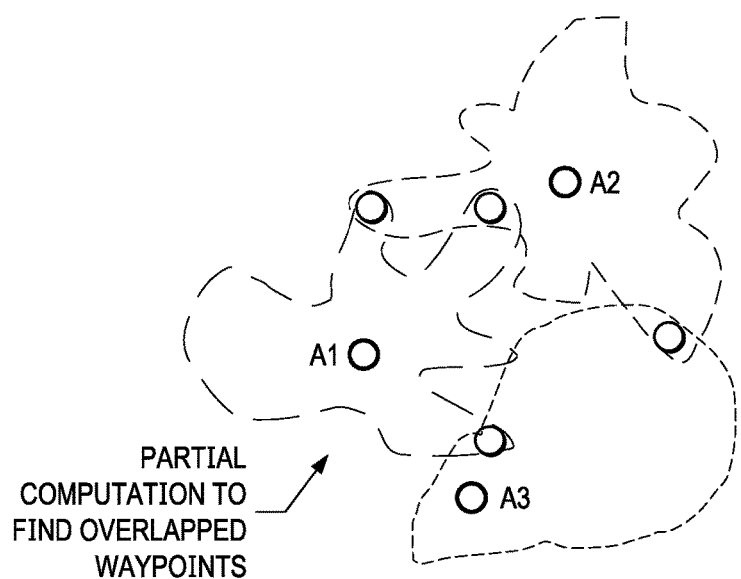
FIG. 10 depicts an alert reasoning algorithm applied to multiple alerts.

FIG. 9 depicts how the results of this priority-based tracking are then used. As shown, alerts arrive to the shared alert queue 900 and are dequeued for processing by the alert reasoning task(s). At step (1), a new alert is dequeued and assigned for processing to a particular alert reasoning task. At step (2), the task carries out the priority-based tracking (such as depicted in FIG. 8) via the partial connection computation (to identify the alert's waypoints), thereby generating the sub-graph 902. This sub-graph, which includes the waypoints, is a partial tracking result that is stored in database 904. At step (3), and by mining the database 904 for other related alerts, the alert reasoning tasks identifies overlapping waypoints with respect to the new alert. In this example, sub-graph 902 is found to overlap with a sub-graph 906 associated with another alert. At step (4), the task outputs a connectivity score for the pair of alerts that are associated to the overlapped waypoints. Of course, in the usual case it is likely that an alert being evaluated by the alert reasoning task may be associated with many alerts. FIG. 10 depicts another example showing alert A1 and its relationship to several other related alerts A2 and A3 (and their associated sub-graphs), as well as the partial computation to find overlapped waypoints for these alerts.

During execution, a state of an alert reasoning task preferably is represented by a set of information: one or more "frontier" entities, i.e., the outermost entities in the causality tracking process, a time that have passed from the beginning of the task, and a current priority of the task (as assigned by the task scheduler to be described below). As the task proceeds, the task priority is updated as a function of the elapsed time, tracking results, and any previous priority.

Figure 11:
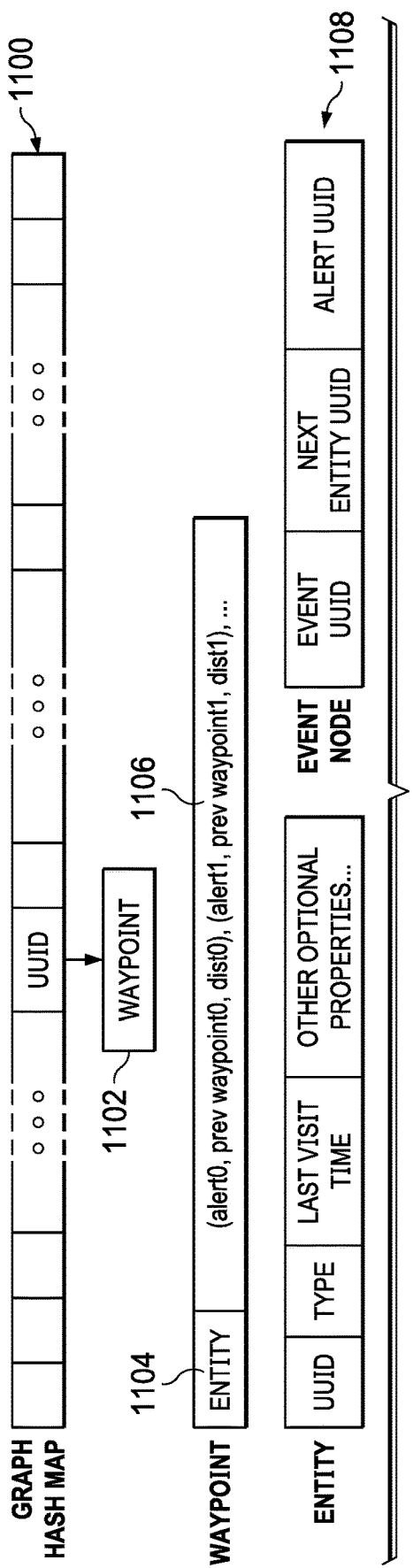
FIG. 11 depicts a representative graph hash map data structure for use in storing priority-based tracking information generated by an alert reasoning task for an alert.
Figure 12:
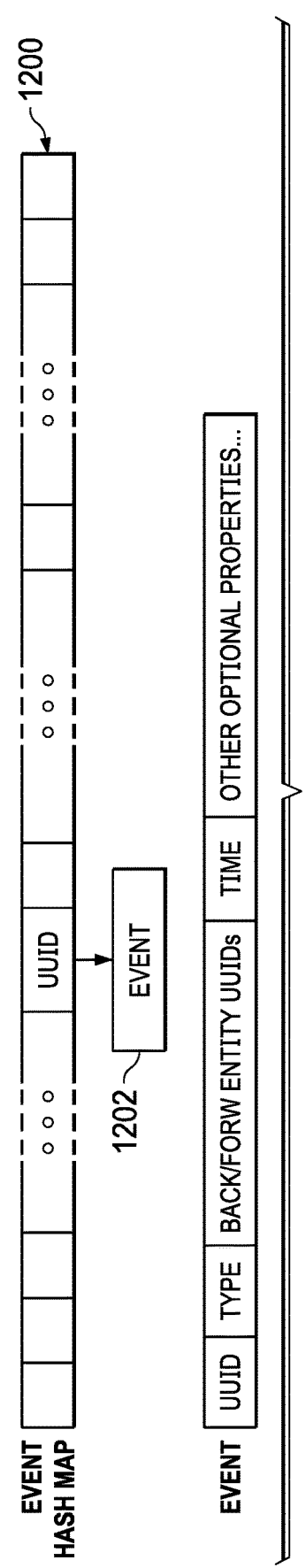
FIG. 12 depicts a representative event hash map data structure for use in storing event information associated with an alert.

Preferably, information generated by the alert reasoning task is stored in a hash-based data structure, sometimes referred to herein as a hash map. FIG. 11 represents a representative hash map 1100 for a particular alert. As depicted, the hash map comprises a set of universally unique identifiers (UUID), each associated with a waypoint 1102. The waypoint 1102 in turn comprises an entity field 1104, and a data field 1106 that includes the tracking information. Thus, for example, the data field 1106 includes one of more tuples {alert|previous waypoint|distance}. The entity field 1104 comprises data associating the UUID with a type, a last visit time, and other optional properties. The waypoint 1102 also points to an associated event node 1108 that comprises data such as an event UUID, a next entity UUID, and an alert UUID. The events preferably are also organized in a hash map, such as depicted in FIG. 12. In particular, event hash map 1200 comprises UUIDs representing events 1202, with each event 1202 comprising a set of data fields, such as UUID, type, a set of backwards/forwards UUIDS, time, and other optional properties. Organizing the information in these hash maps in this manner enables efficient partial connectivity computations, as well as the determination of the overlapping waypoints. Although hash maps are a preferred data structure, other data storage constructs (arrays, linked lists, etc.) may also be used. Hash maps 1100 and 1200 may be combined into a single hash map (e.g., see the concurrent hash map in FIG. 16).

Figure 13:
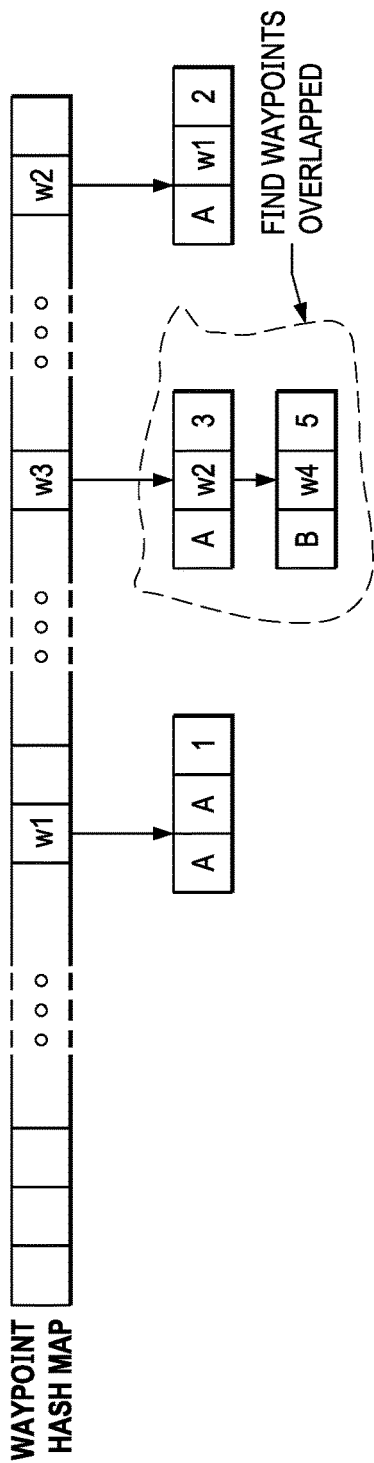
FIG. 13 depicts how the waypoint hash map is used by the alert reasoning algorithm.
Figure 14:
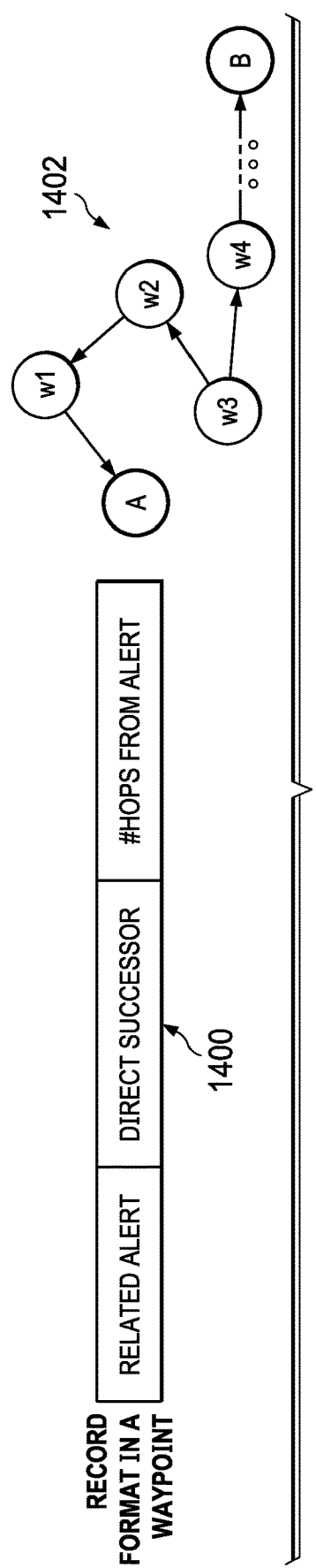
FIG. 14 depicts a representative data record format for a sub-graph for an alert that has been processed by the priority-based tracking scheme of this disclosure.

FIG. 13 depicts how the waypoint hash map is used by the alert reasoning algorithm to enable finding of overlapping waypoints. The alert being examined is alert A, and a related alert B is found. In this example, the tuples {A|w2|3} and {B|w4|5} are found by the algorithm to be overlapping. FIG. 14 then depicts a representative data record format 1400 for the sub-graph 1402. In this example, the format 1400 comprises the tuple {related alert|direct successor|number of hops from alert}.

Figure 15:
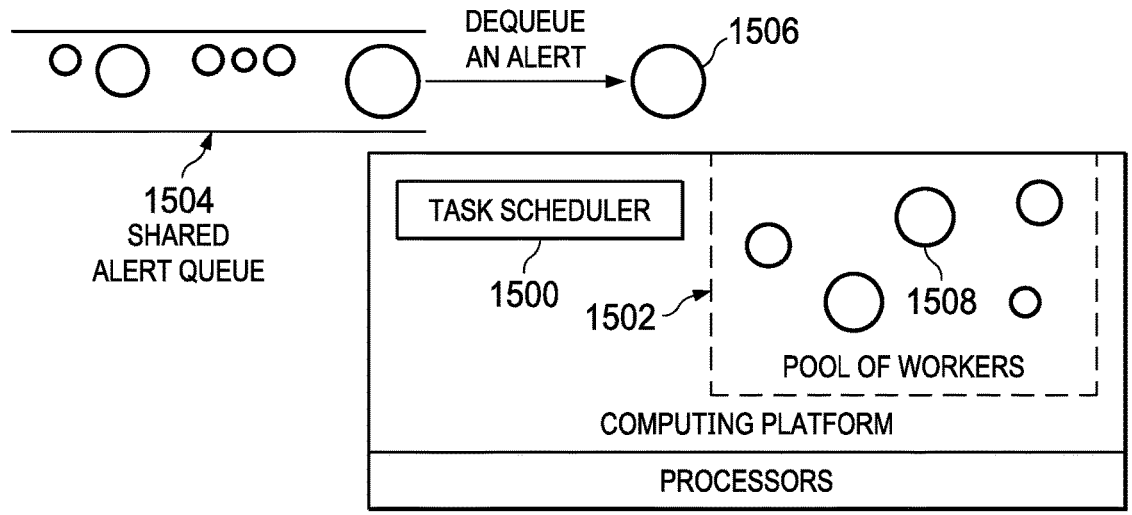
FIG. 15 is a high-level depiction of a real-time alert reasoning system of this disclosure.

The alert reasoning algorithm and these data structures enable efficient alert reasoning by the individual alert reasoning task once the task has been assigned by the task scheduler. Referring now to FIG. 15, the basic architecture of the RAPID system is depicted and comprises a priority-based task scheduler 1500, and a pool of priority-based trackers (workers) 1502. These components are shown as separate, but this is not a requirement. The priority-based scheduler 1500 is responsible for allocating available computation resources to different alert reasoning tasks based on task priorities (typically determined by one or more factors: severity levels, elapsed time, and tracking results). As depicted, the task scheduler 1500 operates in association with the shared alert queue 1504 and, in particular, dequeuing each alert 1506 and assigning it to a given alert reasoning task 1508 for the priority-based tracking, execution of the alert reasoning algorithm to identify overlapping waypoints, etc., all as described above. Typically, a particular alert reasoning task (a worker selected from the pool by the scheduler 1500) is assigned to process a particular alert.

Figure 16:
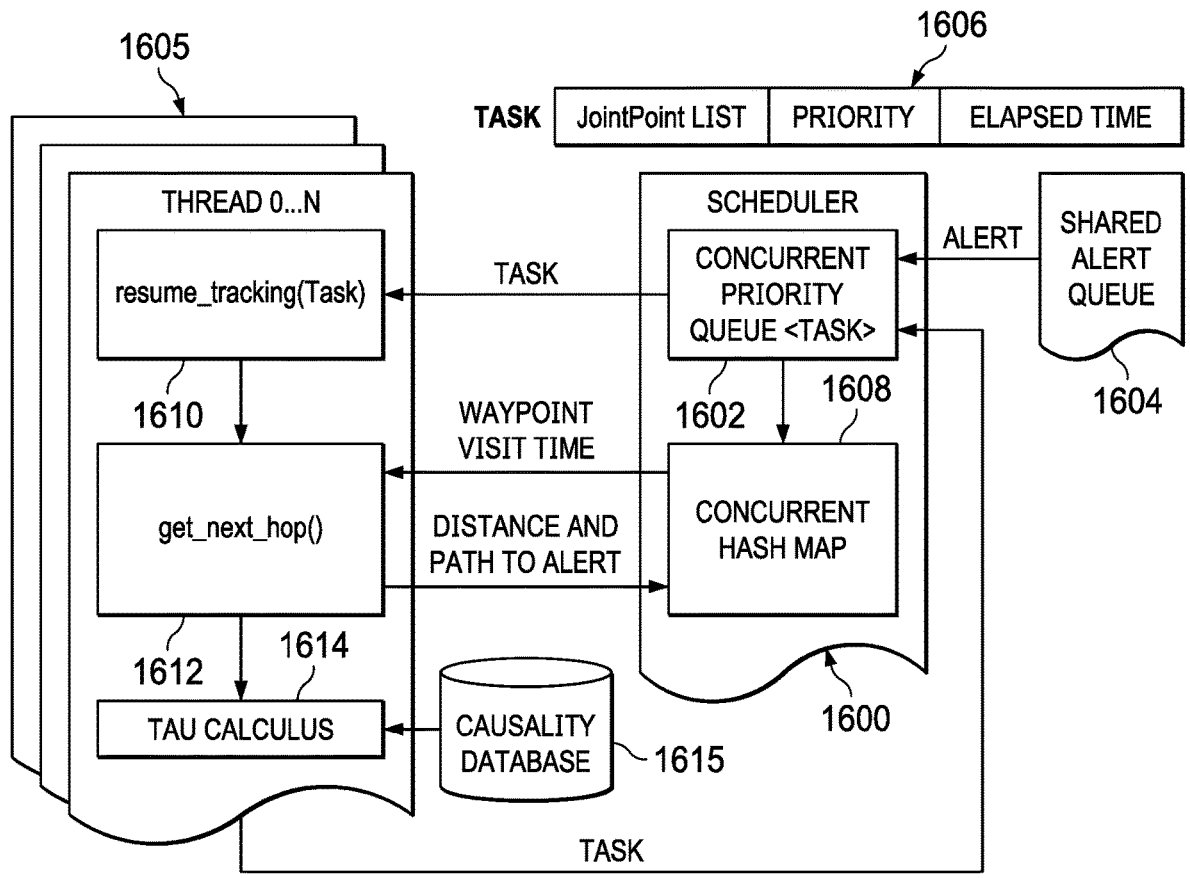
FIG. 16 is a more detailed description of the RAPID system in a preferred embodiment.

FIG. 16 depicts the priority-based scheduling architecture in additional detail. As shown, the task scheduler 1600 comprises a concurrent priority queue 1602, which takes inputs from the shared alert queue 1604 (with alerts typically provided by IDS), transforms them into tasks, and assigns a task 1606 with a highest priority to a tracker 1605 that becomes available. The task is represented by a JointPoint list, a priority, and an elapsed time. The concurrent priority queue 1602 is also responsible for resuming interrupted tasks. The scheduler 1600 also contains a concurrent hash map 1608, which as described above stores the tracking results and is a mapping from the entities to a list of records. A record maintains the shortest paths that connect the corresponding entity to one or more alerts. The priority-based trackers 1605 comprise a pool of workers (or threads). Once assigned with a task 1606, a tracker 1605 starts the priority-based causality backtracking from a given set of frontier entities. To this end, the tracker selects the entity with the highest priority to track (preferably one step) backwards, updates the information of associated entities (including last visiting time, shortest paths, distance and priority), stores the results to the concurrent hash map in the scheduler, and then reassesses the task priority based on the newly-collected information. These operations were described above, and they are carried out by functions 610, 612 and 614 as depicted. Step 614 is an example of a query language and implementation layer (e.g., Tau calculus) that defines how the system interacts with an causality database 1615, fulfilling queries and returning data to the other (upper) processing layers.

Typically, a task priority decreases the longer it executes (especially if it is a long-running task), but the task scheduler can increase a task's priority if suspicious behavior patterns have been detected during the tracking. As noted above, preferably each task is interruptible, with the task's state then being saved. After reassessment (or upon some other scheduling iteration), the task can be interrupted, saved and replaced by an awaiting task with a higher priority.

Generalizing, according to this disclosure, the task scheduler schedules execution by the workers of a set of one or more tasks. A task in the set is associated to process a particular alert. A priority of execution of a particular task is based at least in part on a relative severity of the particular alert. As the particular task executes in a worker thread, the priority-based causality tracking around the particular alert is then performed. Based at least in part on results of the priority-based causality tracking, the severity of the particular alert is then re-assessed. The relative execution priorities for the particular task and the one or more other tasks may then be adjusted as required to take into account any change in the alert's severity. In this way, the task scheduler ensures that the then-highest priority (severity) alert is always being processed by the system, even as the relative severities (as determined by the individual trackers) are updating (changing) in real-time and the available computing resources (for such processing) are being constrained or limited.

Given tasks assigned by the task scheduler typically compete for a worker thread, and after an iteration, (and absent identification of suspicious behavior) a task priority typically is decreased by a configurable factor, so as to afford other tasks an opportunity to obtain a worker. The processing shown in FIG. 16 typically is carried out for multiple worker threads concurrently, as a function of the available computing resources that are available to perform the alert reasoning task(s). At any given time, one or more worker threads (evaluating one or more alerts) are executing concurrently, while other alerts (tasks) wait to obtain workers.

Preferably, the priority of an ongoing investigation is updated after each step of causality tracking. Generalizing, the more the system knows about the past of an alert (and related activities), the better it can judge whether and to what extent available processing and memory resources should be devoted to investigate the alert. During the tracking, preferably all alerts get at least some processing time, but typically the processing time varies and depends on one or more factors such as an alert priority score. This score typically is calculated when the alert is first received or processed and then, as noted above, recomputed after each causality tracking step. In this approach, the scheduler continually reevaluates the priorities and decides which alert to process next. Preferably, the waypoints having been generated by one or more of the interrupted tasks are stored into a list of hashes (a shared space) to facilitate later task resumption.

The above-described approach thus implements interruptible alert tracking tasks, with the task scheduler enabling agile switching among them so that the system can focus on the most critical ones. As noted, preferably this priority-based task schedule is implemented in association with the causality tracking that automatically adjusts to the context information learned from tracking. As the task proceeds, its task priority is updated as a function of the elapsed time, previous priority and tracking results. The task scheduler preferably assigns computational resources according to the task priorities. In the alert tracking task, entity priority-based investigation around a given alert is performed. In particular for each entity, the task evaluates the causal paths from alerts to the entity and derives its priority. In doing so, the system thereby incorporates the attack knowledge, information gain and learning-based anomaly detection algorithms into the priority computation. At each step of tracking, preferably the entity bearing the highest priority tracks (preferably one-hop) backwards.

The use of waypoints during the causality tracking as described herein provides significant advantages, in part because it obviates the requirement to explore whether or how each alert is connected with all previous ones (especially after the scheduler interrupts execution of one or more tasks during its typical operation). By setting waypoints as the important entities (during the causality tracking for a task), storing the waypoints in a list of hashes for pausing/resuming a task, and then also sharing the waypoints (as partial or "intermediate" results) among multiple tasks in a shared space, the approach avoids the workers having to recalculate connections that reach the same waypoint when interrupted tasks are later resumed. In other words, preferably waypoints computed during causality tracking for one task are sharable/shared across tasks, thereby significant improving processing efficiency.

Generalizing, intermediate results from the execution of the tasks or their subtasks are shared (potentially among all tasks) to avoid recomputation of what would otherwise be shared subtasks. The following provides an example scenario. As noted above, causality reasoning may involve dividing a task into smaller tasks. For instance, to find an initial process A of process X (the task), the system may divide the task into the following subtasks: finding the parent process Y of X (a first subtask), and finding the initial process of Y (a second subtask). In this example, assume the system searches for process Z along the path from X to A, establishing Z as a waypoint because. e.g., it is a hub process with many connections. Now, when the task of X is interrupted, Z is then saved a waypoint and intermediate result. The waypoint or intermediate result can then be used by another task W if, e.g., the causality reasoning of W hits the waypoint Z. The reasoning beyond the waypoint is shared between X and W, and it is only performed once. In other words, and in the causality reasoning of W, if the system sees some entities (waypoints) already checked, those intermediate results are used to construct the results for W. Thus, a waypoint is a concrete type of intermediate result. A waypoint also can result from processing other subtasks.

For a causality reasoning task around each alert, typically the most important intermediate results are the entities around or otherwise reachable via single or multi-hop connection, with these entities then expressed as the waypoints. Intermediate results may also include attributes, labels, and other information about the waypoints.

Although typically the scheduler is configured to enable real-time alert reasoning over critical alerts, the notion of "most critical" or "critical" is not intended to be limiting; as a variant embodiment, the particular scheduling routine implemented by the task scheduler may vary depending on the nature of the implementation including, without limitation, the then-available computing power. The nature of the scheduling may also vary based on or in conjunction with other factors such as a security policy, time-of-day, occurrence of some event, etc.

An alert reasoning task may be implemented using machine learning, which may be supervised or unsupervised. The most widely used supervised learning algorithms are Support Vector Machines, Linear Regression, Logistic Regression, Naive Bayes, and Neural Networks. In unsupervised machine learning, the algorithm trains on unlabeled data. The goal of these algorithms is to explore the data and find some structure within. The most widely used unsupervised learning algorithms are Cluster Analysis and Market Basket Analysis. The particular machine learning (ML) algorithms or computations that may be implemented by an alert reasoning task are not an aspect of this disclosure.

The techniques described provide significant advantages, especially with respect to enabling robust and computationally-efficient APT defense. As has been described, real-time alert tracking for efficient campaign discovery is enabled using scheduling and prioritization, with the system preferably composed of concurrent tracking procedures. Advantageously, each alert tracking task is configured and maintained as a task state such that tasks can be interrupted, saved and resumed later for further exploration. Instead of outputting entire tracking results in the end, results of an attack are harvested continuously such that partial results are stored and become available for analytics even if the tracking is ongoing or being paused. The system also leverages one or more data structures that store the shared tracking information between tasks and facilitates connecting-the-dots between and among alerts. To this end, the system advantageously leverages a selected set of waypoints that can assist the security analysts to reconstruct the causal path from one alert to another.

The techniques herein provides for a context-adaptive prioritization algorithm for multi-alert tracking by automatically integrating context information gathered in the process of tracking. Compared with previous work, the techniques herein are advantageous because they enable to system to dynamically assess alert priorities based on the tracking results and thus adaptively prioritize the investigation of an immense stream of alerts. In doing so, RAPID keeps up with real-time alert generation and focuses on the most promising direction to achieve efficient campaign discovery. To this end, and by implementing a task queue and scheduling according to a dynamically-derived priority, the RAPID system adapts causality tracking prioritization to newly-learned context. The system also can be advantageously deployed on top of existing alert reasoning and correlation techniques that pre-process and correlate low-level alerts (e.g., using clustering and pattern matching) to prioritize the causality investigation around multiple alerts after such correlation.

The techniques herein also provide for automating the process of constructing a high-level graph summarizing the causal connections between alerts, which enriches the context of each alert and provides the security analysts with a compact and informative view for further alert exploration. This graph can be used to rank the significance of alerts, guide the automated priority-based search as well as manual examination.

Summarizing, the sheer number of alerts and the often limited available processing power raise a challenge in today's threat discovery and response procedures. Not only a problem for skilled human analysts, the complexity of threat reasoning tasks also stresses out automated procedures and prevents new and critical alerts from being analyzed in a timely manner. To keep up with real-time alert generation and to agilely shift focus among different reasoning tasks, the techniques of this disclosure provide a real-time alert reasoning system composed of interruptible alert reasoning procedures for context enrichment and provenance tracking, as well as prioritized campaign discovery scheduling. The system tracks multiple attack campaigns concurrently, reacts to new alerts timely, and (where necessary) allocates limited computation resources to critical reasoning steps.

As noted, the approach herein also is designed to be implemented in an automated manner within or in association with a security system, such as a SIEM, an APT solution, an endpoint management solution, and others.

The functionality described above (or any portion thereof) may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the graph generation techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, among others: alert reasoning systems, APT solutions, security incident and event management (SIEM) systems, as well as improvements to knowledge graph-based cyber-analytics, including threat hunting. Cyber threat hunting is the process of proactively and iteratively formulating and validating threat hypotheses based on security-relevant observations and domain knowledge. The approach herein facilitates such activities by modeling threat discovery as a graph computation problem. Given a process graph that records objective computation histories regarding both intrusive and non-intrusive data, threat discovery reduces to the graph query problem of iteratively computing a closure over a subset of security-related subgraphs in the process graph, and then finally yielding the subgraph that describes the threat of intrusion. Graph queries can be pre-programmed into intrusion detection systems or behavior anomaly detection systems, or the like. Threat hunting composes sequences of graph queries to iteratively and interactively conceive, verify, revise and confirm threat hypotheses.

Having described the subject matter, what we claim is as follows:

1. A method for real-time processing of security alerts received from one or more alerting sources, comprising:
   scheduling execution of a set of tasks in a set of computing resources, wherein a task in the set is associated to process a particular alert, and wherein a priority of execution of a particular task relative to one or more other tasks is based at least in part on a severity of the particular alert;
   as the particular task and the one or more other tasks execute concurrently in the set of computing resources, performing priority-based causality tracking that tracks one or more causal dependencies backwards from the particular alert, wherein priority-based causality tracking includes, for at least one task: (i) setting one or more waypoints; (ii) upon interrupting execution of the at least one task, saving the waypoints set; and (iii) upon resumption of the at least one task, reusing the saved waypoints set to avoid recomputation of connections that reach the waypoints;
   based at least in part on results of the priority-based causality tracking, re-assessing the severity of the particular alert; and
   adjusting a priority of execution of the particular task relative to the one or more other tasks based at least in part on re-assessment of the severity of the particular alert.

2. The method as described in claim 1 further including taking a given action with respect to the execution of the particular task.

3. The method as described in claim 2 wherein the given action is one of:
   interrupting the particular task, and resuming the particular task.

4. The method as described in claim 1 wherein the waypoints set for the at least one task are saved as partial causality tracking results in a space shared by all of the tasks.

5. The method as described in claim 1 wherein performing priority-based causality tracking around the particular alert identifies, for each entity of one or more entities in a causal graph, one or more causal paths from the particular alert to the entity, and for each such causal path, a priority.

6. The method as described in claim 5 further including selecting an entity bearing a highest priority and performing additional causality tracking with respect to the selected entity.

7. The method as described in claim 1 wherein a priority of execution increases as a result of the priority-based causality tracking indicating suspicious behavior.

8. The method as described in claim 1 wherein the particular alert is associated with an Advanced Persistent Threat (APT).

9. An apparatus, comprising:
   a processor;
   computer memory holding computer program instructions executed by the processor to provide real-time processing of security alerts received from one or more alerting sources, the computer program instructions, when executed by the processor, are configured to:
   schedule execution of a set of tasks in a set of computing resources, wherein a task in the set is associated to process a particular alert, and wherein a priority of execution of a particular task relative to one or more other tasks is based at least in part on a severity of the particular alert;
   as the particular task and the one or more other tasks execute concurrently in the set of computing resources, perform priority-based causality tracking that tracks one or more causal dependencies backwards from the particular alert, wherein priority-based causality tracking includes, for at least one task: (i) setting one or more waypoints; (ii) upon interrupting execution of the at least one task, saving the waypoints set; and (iii) upon resumption of the at least one task, reusing the saved waypoints set to avoid recomputation of connections that reach the waypoints;
   based at least in part on results of the priority-based causality tracking, re-assess the severity of the particular alert; and
   adjust a priority of execution of the particular task relative to the one or more other tasks based at least in part on re-assessment of the severity of the particular alert.

10. The apparatus as described in claim 9 wherein the program instructions are further configured to take a given action with respect to the execution of the particular task.

11. The apparatus as described in claim 10 wherein the given action is one of: interrupting the particular task, and resuming the particular task.

12. The apparatus as described in claim 9 wherein the waypoints set for the at least one task are saved as partial causality tracking results in a space shared by all of the tasks.

13. The apparatus as described in claim 9 wherein the program code configured to perform priority-based causality tracking around the particular alert comprises program code further configured to identify, for each entity of one or more entities in a causal graph, one or more causal paths from the particular alert to the entity, and for each such causal path, a priority.

14. The apparatus as described in claim 13 wherein the program code is further configured to select an entity bearing a highest priority and to perform additional causality tracking with respect to the selected entity.

15. The apparatus as described in claim 9 wherein a priority of execution increases as a result of the priority-based causality tracking indicating suspicious behavior.

16. The apparatus as described in claim 9 wherein the particular alert is associated with an Advanced Persistent Threat (APT).

17. A computer program product in a non-transitory computer readable medium for use in a data processing system to provide real-time processing of security alerts received from one or more alerting sources, the computer program product holding computer program instructions that, when executed by the data processing system, are configured to:
   schedule execution of a set of tasks in a set of computing resources, wherein a task in the set is associated to process a particular alert, and wherein a priority of execution of a particular task relative to one or more other tasks is based at least in part on a severity of the particular alert;

as the particular task and the one or more other tasks execute concurrently in the set of computing resources, perform priority-based causality tracking that tracks one or more causal dependencies backwards from the particular alert, wherein priority-based causality tracking includes, for at least one task: (i) setting one or more waypoints; (ii) upon interrupting execution of the at least one task, saving the waypoints set; and (iii) upon resumption of the at least one task, reusing the saved waypoints set to avoid recomputation of connections that reach the waypoints;

based at least in part on results of the priority-based causality tracking, re-assess the severity of the particular alert; and adjust a priority of execution of the particular task relative to the one or more other tasks based at least in part on re-assessment of the severity of the particular alert.

18. The computer program product as described in claim 17 wherein the program instructions are further configured to take a given action with respect to the execution of the particular task.

19. The computer program product as described in claim 18 wherein the given action is one of: interrupting the particular task, and resuming the particular task.

20. The computer program product as described in claim 17 wherein the waypoints set for the at least one task are saved as partial causality tracking results in a space shared by all of the tasks.

21. The computer program product as described in claim 17 wherein the program code configured to perform priority-based causality tracking around the particular alert comprises program code further configured to identify, for each entity of one or more entities in a causal graph, one or more causal paths from the particular alert to the entity, and for each such causal path, a priority.

22. The computer program product as described in claim 21 wherein the program code is further configured to select an entity bearing a highest priority and to perform additional causality tracking with respect to the selected entity.

23. The computer program product as described in claim 17 wherein a priority of execution increases as a result of the priority-based causality tracking indicating suspicious behavior.

24. The computer program product as described in claim 17 wherein the particular alert is associated with an Advanced Persistent Threat (APT).

25. A computing system for security alert processing, comprising:
  a task scheduler comprising a priority queue and a hash-based data structure; and
  a set of workers that share, concurrently, a set of computing resources in the computing system;
  the task scheduler configured to allocate the set of computing resources in the computing system preferentially to execute, by the workers, a set of alert reasoning tasks, wherein an alert with a highest severity in the priority queue is assigned a highest priority of execution;
  while the set of workers execute concurrently, the task scheduler further configured to adjust a priority of execution of one or more alert reasoning tasks upon a determination that another alert should be assigned the highest severity;
  wherein the determination is based at least in part on priority-based causality tracking that tracks one or more causal dependencies backwards from an alert;
  wherein partial causality tracking results generated during processing of one or more alert reasoning tasks are saved in the hash-based data structure for reuse to avoid recomputation;
  wherein the task scheduler and the set of workers are implemented as software executing in hardware.

\* \* \* \* \*